United States Patent [19]
Honea

[11] 3,773,195
[45] Nov. 20, 1973

[54] DRIVE IN BOAT CARRYING TRAVEL TRAILER

[76] Inventor: Loyd M. Honea, P.O. Box 81, Abilene, Tex. 79604

[22] Filed: Nov. 12, 1971

[21] Appl. No.: 198,143

Related U.S. Application Data

[63] Continuation-in-part of Ser. No. 49,730, June 25, 1970, abandoned.

[52] U.S. Cl.................................. 214/84, 193/35 SS
[51] Int. Cl............................ B60p 3/10, B60p 3/32
[58] Field of Search............................ 214/84, 500; 296/23 MC; 193/35 SS

[56] References Cited
UNITED STATES PATENTS

| | | | |
|---|---|---|---|
| 3,126,855 | 3/1964 | Freeburg.......................... | 214/500 X |
| 2,847,136 | 8/1958 | Neff.................................. | 214/500 |
| 2,942,744 | 6/1960 | Hall.................................. | 214/500 |
| 2,840,252 | 6/1958 | Weber.......................... | 193/35 SS X |
| 3,294,263 | 12/1966 | Naden et al. .................... | 214/84 |
| 3,604,580 | 9/1971 | Geister ...................... | 296/23 MC X |

Primary Examiner—Ablert J. Makay
Attorney—Wm. T. Wofford et al.

[57] ABSTRACT

The specification discloses a trailer that serves both as a camping trailer and as a boat trailer and which allows a boat to be launched by simply backing the trailer down into the water's edge and then backing the boat out on adjustable rollers secured inside the trailer. The boat may be loaded by driving or pulling the boat back into place while the trailer is in the water at its edge. The trailer has a well formed in the rear end thereof below the floor surface for receiving water when the trailer is backed into the water to allow a boat to be received partially in the well. Rollers supported in the well are adapted to be moved to operative positions above the level of the floor surface for supporting a boat and to inoperative positions in the well below the level of the floor surface when the boat has been launched from the trailer. Removable floor sections are provided for covering the well when the rollers are moved to their inoperative positions and after the boat has been launched whereby complete use of the trailer may be used for camping or living purposes.

9 Claims, 8 Drawing Figures

PATENTED NOV 20 1973

INVENTOR
Loyd M. Honea
BY
Wofford, Felsman & Fails
ATTORNEYS

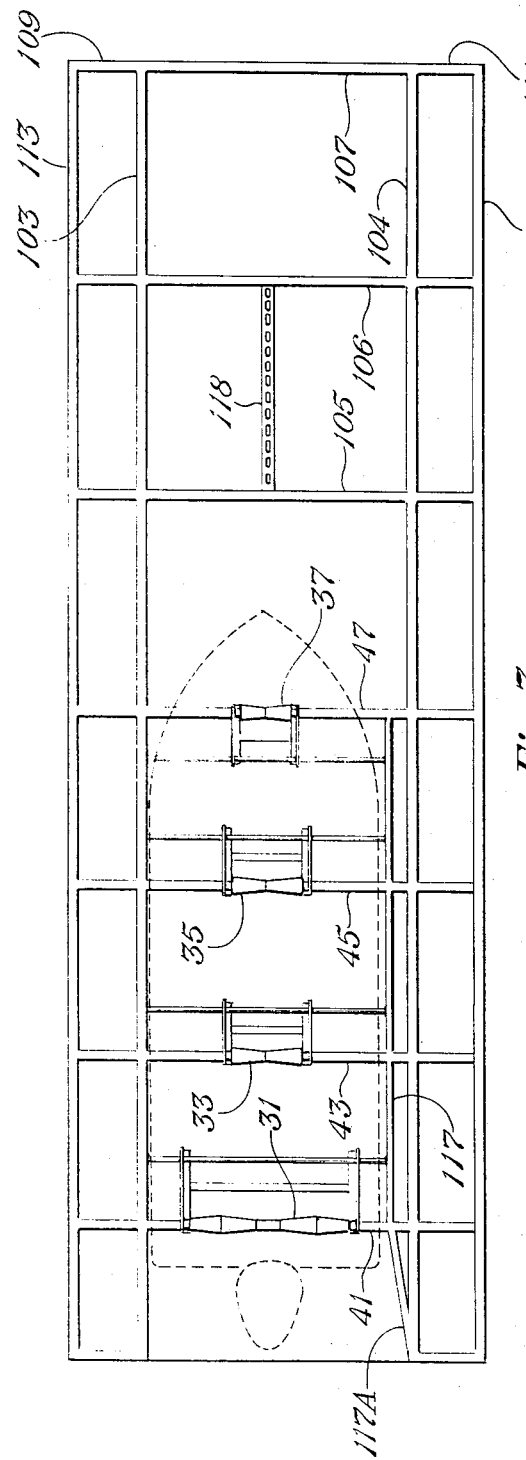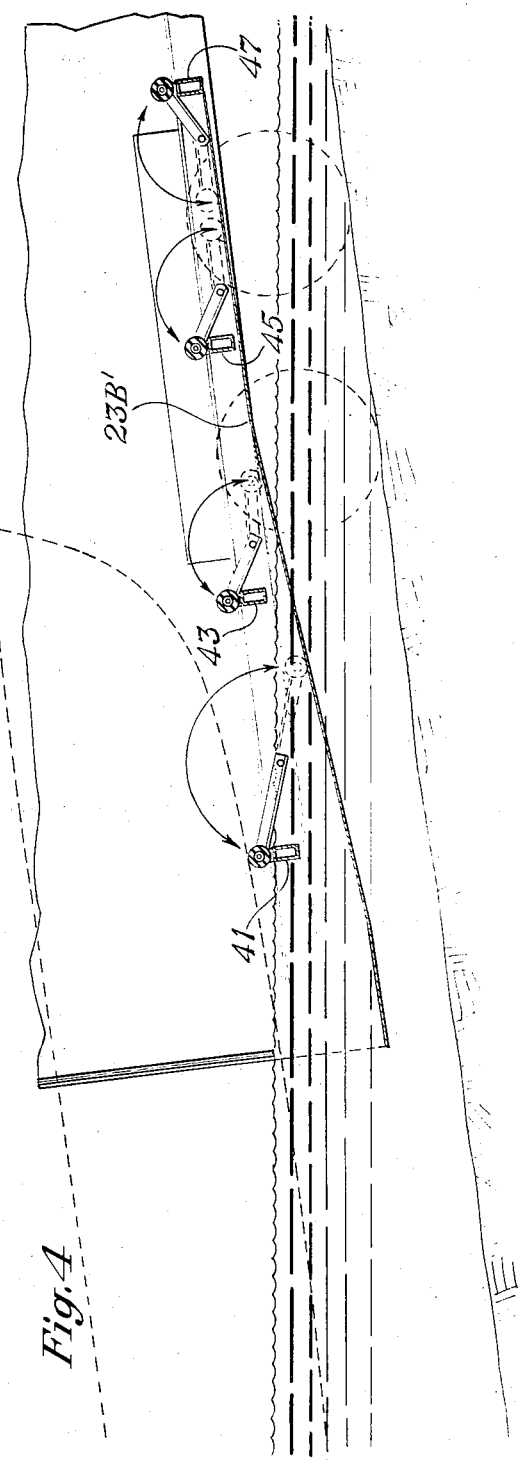

3,773,195

DRIVE IN BOAT CARRYING TRAVEL TRAILER

This application is a continuation-in-part of U.S. application Ser. No. 49,730, filed June 25, 1970, now abandoned by Loyd M. Honea.

BACKGROUND OF THE INVENTION

This invention relates to a travel trailer or camper that serves both as a boat trailer and as a camping or living trailer.

For the outdoor camping and boating enthusiast, a need has existed for a trailer that may serve both as a camper and as a trailer for carrying a boat within the trailer while on the road. Devices of this nature have been proposed or built, however, they have required cumbersome or expensive auxiliary equipment such as launching trailers, telescoping mechanisms, conveying devices, etc. for loading the boat into the camper and for unloading or launching the boat from the camper.

In accordance with the present invention, there is provided a travel trailer for carrying a boat and for providing living accommodations and which eliminates the need for the auxiliary loading or launching equipment. The trailer has a floor surface, side walls, a top, and an entrance in the rear end thereof for receiving and launching a boat. A well is formed in the rear end of the trailer below the floor surface for receiving water when the rear end of the trailer is backed into the water to allow a boat to be received at least partially in the well. Support means associated with the well is provided for supporting a boat in the trailer. The support means allows a boat to be received into the trailer and launched from the trailer by way of the water received in the well when the trailer is backed into the water.

In the embodiment disclosed, the support means comprises rollers coupled to structure supported in the well and are adapted to be moved to operative positions above the level of the floor surface for supporting a boat and to inoperative positions in the well below the level of the floor surface when the boat has been removed from the trailer. In addition removable floor sections are provided to cover the well when the rollers are in their inoperative positions whereby the well may be covered and the area thereabove employed for living purposes when the boat has been removed or launched from the trailer. These floor sections are removed to allow the rollers to be moved to their operative positions when it is desired to load and carry a boat in the trailer. When not in use the floor sections are stored in the trailer.

In the embodiment disclosed a plurality of rollers are provided, each of which are coupled to the ends of arms which may be swung in place and supported on cross-beams extending across the well at positions spaced inward from the rear end of the well for supporting a boat while in the trailer. After the boat has been removed, these rollers are swung down into the well and stored therein below the level of the floor whereby the floor sections may be inserted in place to cover the well.

BRIEF DESCRIPTION OF THE DRAWINGS

FIG. 3 is a top view of the supporting beams which form the base of the trailer and illustrating the position of the well and the rollers employed for supporting a boat in the well;

FIG. 4 is a partial side view of the trailer in cross-section illustrating in more detail the manner in which the rollers may be moved to their operative and inoperative positions;

DETAIL DESCRIPTION OF THE PREFERRED EMBODIMENT

Figure 1:
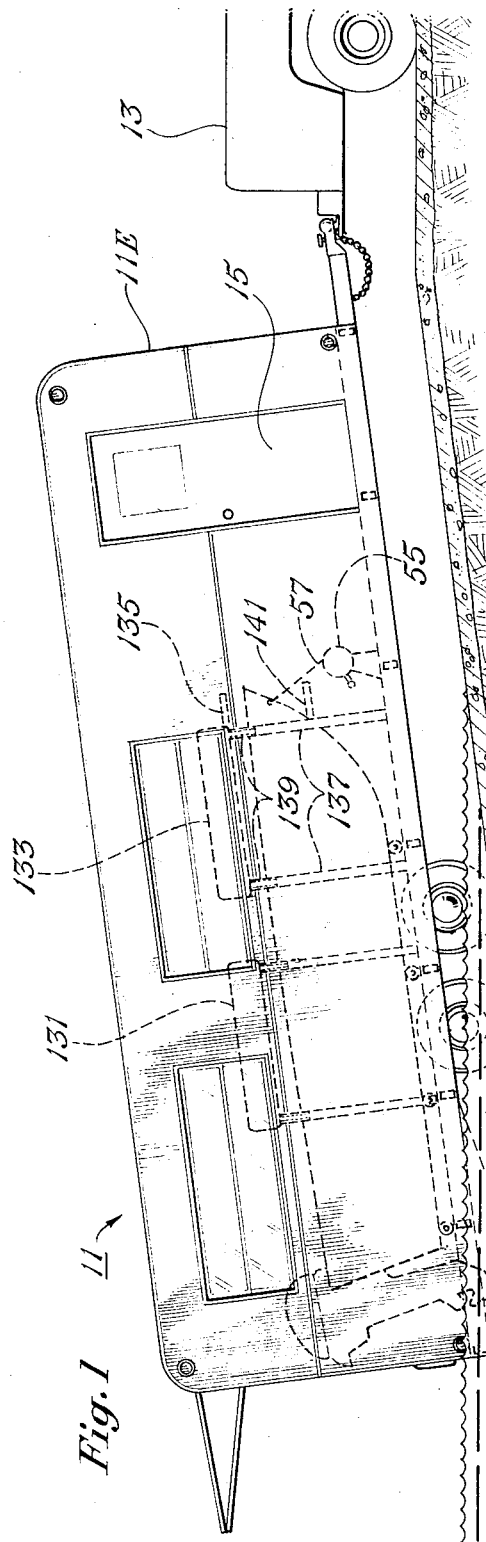
FIG. 1 is a side view of the trailer backed into the water's edge for launching or loading a boat from or into the trailer.
Figure 2:
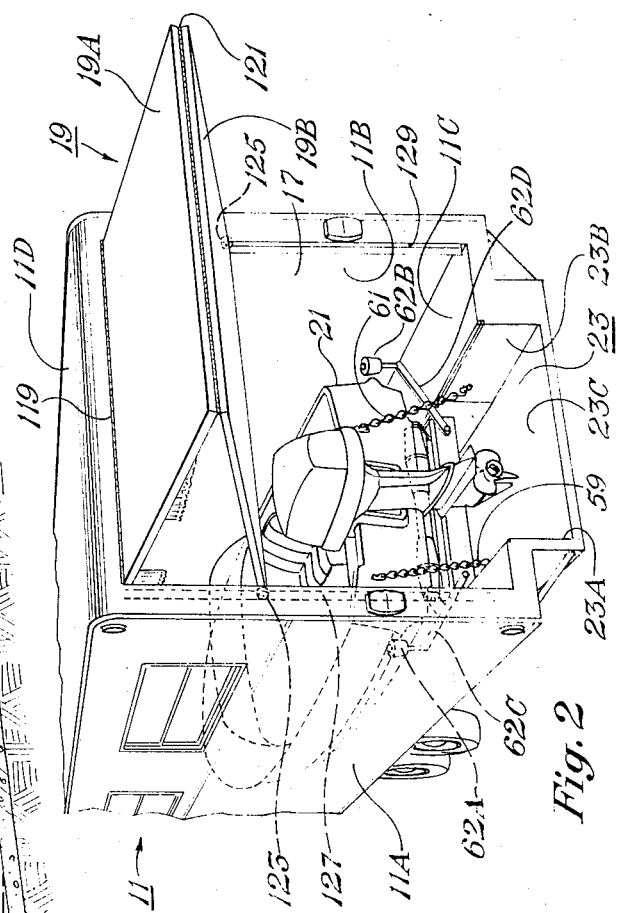
FIG. 2 is a rear end of the trailer with a boat loaded and secured inside the trailer.

Referring to FIGS. 1 and 2, the boat trailer-camper of the present invention is designated by reference numeral 11. In FIG. 1 it is illustrated as being backed into the water's edge by a towing vehicle illustrated at 13. The trailer has side walls 11A and 11B, a floor surface 11C, a top 11D, and a front wall 11E. A door 15 is provided at the front of the trailer for entrance by its occupants. In addition a rear entrance 17, which may be opened and closed by a rear end door 19, is provided for loading and launching a boat into and from the trailer. In FIG. 2, a boat loaded into the trailer is illustrated at 21.

Formed in the rear end of the trailer and below the floor surface 11C is a well 23. This well receives water through its rear end when the trailer is backed into the water and is employed to facilitate loading and launching of the boat. As illustrated, the well 23 has side walls 23A and 23B and a bottom 23C.

Figure 5:
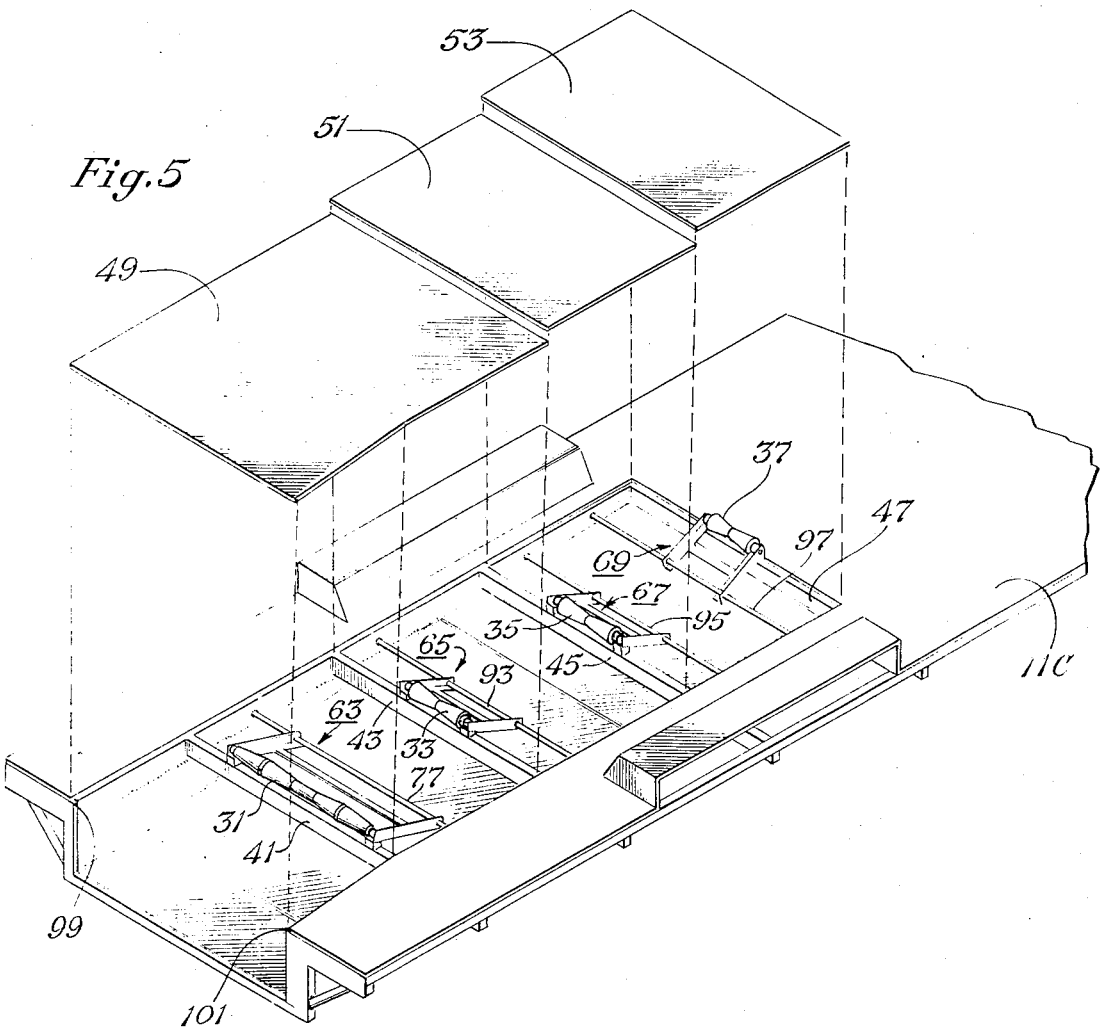
FIG. 5 is an isometric view of the well and the removable floor sections employed for covering the well when a boat has been removed from the trailer.

Pivotally supported for movement into the well to inoperative positions and out of the well to operative positions are four rollers illustrated at 31, 33, 35, and 37 in FIGS. 3 and 5. In the operative positions, these rollers are supported by cross-beams 41, 43, 45, and 47 respectively for supporting the boat 21 above the floor surface 11C while in the trailer. In the inoperative positions, these rollers are stored in the well below the floor surface 11C of the trailer whereby removable floor sections illustrated at 49, 51, and 53, in FIG. 5 may be inserted in place to cover the well.

Cross-beam 41 is spaced inward from the rear of the trailer to provide an open zone or spaced at the rear of the well to allow a boat to be received or located partially in the rear of the well during loading or launching. In addition the open zone at the rear of the well provides space for locating the lower end of the boat's motor when the boat is loaded in the trailer.

Referring to FIGS. 3 and 5, the well is slightly offset from the center of the trailer along its length and extends toward the front of the trailer to the cross-beam 47 which is located mid-way of the length of the trailer. From this beam backward, to a position at 23B' (see FIG. 4) between beams 43 and 45, the well is relatively shallow. From point 23B' to the rear of the trailer, the well slopes downward to a maximum depth at the rear of the trailer. In one embodiment the well is about 6 inches below the floor surface 11C between beam 47 and point 23B' while the maximum depth of the well at the rear of the trailer is about 14 inches below the floor surface 11C. This depth, plus the height of the rollers above the level of the floor surface, when supported in their operative positions, are sufficient to maintain the propeller of a boat, of an appropriate size, within the well but above the bottom 23B at the rear when the boat is loaded and supported in the trailer. It is to be understood that the well may have a maximum depth at its rear different from 14 inches, however, this depth has been found to be satisfactory for carrying boats of a wide variety of sizes. Since the front of the well is employed primarily to support and store the rollers below the level of the floor 11C (when not in use) the depth of the front of the well need not be as great as that of the rear.

When carrying a boat, it is secured in place with a winch 55 and cable 57 coupled to the bow of the boat as illustrated in FIG. 1. In addition tie down chains 59 and 61 coupled to the side walls 23A and 23B of the well, are provided for securing the rear end of the boat in place. When not in use, the floor sections 51, 53, and 55 are securely stored in the trailer.

When it is desired to launch a boat, the trailer is backed into the water's edge to a position whereby the water will enter the rear portion of the well to a level preferably slightly below the floor surface 11C at its rear edge. In this position, the boat's propeller is immersed in water. The boat may then be launched by disconnecting the chains 59 and 61 and backing the boat into the water with its motor running while the cable 57 is reeled out. In the alternative, it may not be necessary to run the motor while it is being launched since the rollers are mounted on ball bearings and generally the boat will freely roll on the rollers into the water without requiring the aid of the motor.

When loading the boat into the trailer, the trailer again is backed into the water to a position whereby the well is filled with water to the level of the floor surface 11C at its rear edge as indicated above. The boat then is driven partially into the trailer to a position whereby its bow is in contact with the rear roller 31. The motor speed may then be increased to drive the boat up on the rollers and into the well. In the alternative, the cable 57 may be attached to the bow of the boat and the boat pulled up on the rollers and into the trailer with the winch 55.

Guides 62A and 62B, as well as the rollers 31, 33, 35, and 37 (due to their shape) are employed to guide the boat in the trailer when being loaded or launched. The arms 62C and 62D of guides 62A and 62B, respectively, are pivotally coupled to cross beam 41 whereby they may be swung down and stored in the well below the floor surface 11C when not in use.

Figure 6:
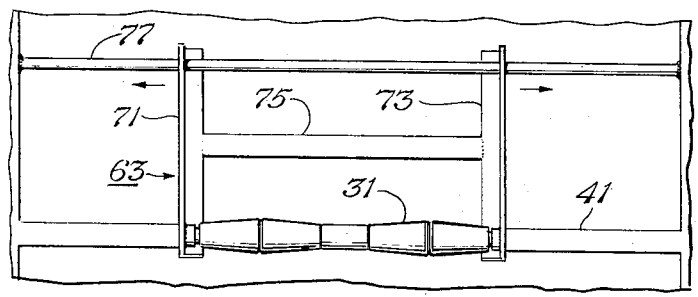
FIGS. 6 and 7 are top and side views respectively of the rear roller illustrating in more detail its structure.
Figure 7:
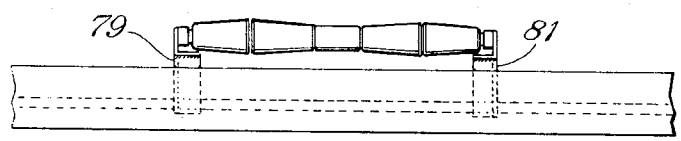

Referring now to FIGS. 5-8, more detail of the rollers and supporting structure will be given. Each roller is mounted at the end of a pivotally supported arm assembly. The four arm assemblies are illustrated at 63, 65, 67, and 69. Since the arm assemblies are constructed the same, although they are of different sizes, reference will be had specifically to the arm assembly 63 illustrated in more detail in FIGS. 6 and 7 for supporting the roller 31. This assembly comprises two angle irons 71 and 73 which are rigidly held together by a crossplate 75 welded to each of the angle irons. The angle irons each have first ends pivotally coupled to a crossbar 77. In this respect the vertical edges of the angle irons 71 and 73 have apertures extending therethrough and through which is inserted the bar 77. This bar in turn is welded or secured to the sides 23A and 23B of the well 23 at a position below the level of the floor surface 11C. The roller 31 is supported between the opposite ends of the angle irons 71 and 73. The assembly 63 and hence the roller 31 may be pivoted or rotated between an operative position on the cross-beam 41 as illustrated in FIGS. 4–6 to an inoperative position where the roller rests on the bottom of the well 23 as illustrated in dotted form in FIG. 4. In this latter position the roller and hence the arm assembly is below the level of the floor surface 11C and out of the way.

In the operative position, the end of the arm assembly which supports the roller 31 rests upon the cross-beam 41 to position the roller 31 above the level of the floor surface as indicated previously. In this respect elevating blocks 79 and 81 (see FIG. 7) are welded to the lower edge of the angle irons 71 and 73 below the roller 31. These blocks support the roller above the top surface of the cross-beam 41 whereby it may be rotated free and clear of the cross-beam.

Figure 8:
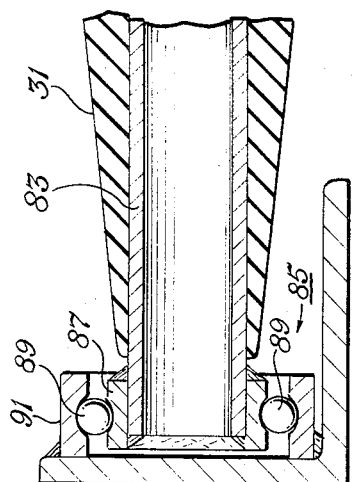
FIG. 8 is an enlarged cross-sectional view of the rear roller illustrating the manner in which it is supported by ball bearings.

Referring to FIG. 8, the roller 31 is formed of resilient material such as rubber or plastic and has a bore or aperture extending therethrough into which a pipe or tubing 83 is inserted. The outside diameter of the pipe 83 is such that there is a tight fit between the exterior of the pipe 83 and the interior of the roller 31. The ends of the pipe or tube 83 are supported by ball bearings which are secured to the angle irons 71 and 73 respectively. One bearing support is illustrated at 85 in FIG. 8. The end of the pipe 83 is welded to the inside ring 87 which in turn is supported for rotation by steel balls 89 located between the inside ring 87 and the outside ring 91. The outside ring 91 in turn is welded to the vertical edge of the angle iron 71. A similar connection is had between the other end of the pipe 83 and the angle iron 73.

Each of the arm assemblies 65, 67, and 69 for supporting the rollers 33, 35, and 37 respectively are constructed in a manner similar to that of arm assembly 63 and are pivotally supported to pivot rods 93, 95, and 97 respectively secured to the side walls 23A and 23B of the well 23 below the level of the floor surface 11C. Thus in their operative positions, each of the rollers 31, 33, 35, and 37 are supported by their respective cross-beams above the level of the floor surface 11C for supporting a boat. In the inoperative position each of the rollers and their supporting arm assemblies rest on the bottom of the well 23 below the level of the floor surface 11C. As seen in the Figs., pivot rod 77 is located between cross-beams 41 and 43 while pivot rod 93 is located between cross-beams 43 and 45. Both of pivot rods 95 and 97 are located between cross-beams 45 and 47. The arms of arm assemblies 67 and 69, however, are short enough whereby they may be moved to their inoperative positions between beams 45 and 47 without interference from each other.

When the rollers are moved to their inoperative positions in the well 23 below the floor surface 11C, the floor sections 49, 51, and 53 may be inserted in place to cover the well 23 to allow the full area of the trailer to be employed for living purposes as indicated previously. Shoulders 99 and 101 formed between the side walls 23A and 23B and the floor surface 11C are employed for supporting the floor sections 49, 51, and 53 when inserted in place to cover the well 23. In addition the adjacent ends of floor sections 49 and 51 rest on cross-beam 43 while the adjacent ends of floor sections 51 and 53 rest on cross-beam 45. In addition the opposite end of floor section 53 rests upon cross-beam 47.

As indicated previously, the well 23 is offset from the center of the trailer 11 along its length and as seen in FIG. 3, it is located to the left of the center line. This arrangement is provided to support the boat to the left of the center line to counterbalance the effect of the slope of a normal road while the trailer is being towed with a vehicle. In addition it provides room on the right hand side of the boat to allow passage of a person along the side of the boat while it is in the trailer.

In order to accommodate boats of different widths, each arm assembly may be moved along its supporting rod to the left or to the right. For example, the arrows in FIG. 6, illustrate that the arm assembly 69 may be slid to the left or to the right along the rod 77. If a wide boat is to be loaded into the trailer it may be desirable to move the arm assemblies to the right to insure that the port side of the boat is clear of the inside wall of the trailer side 11A.

In one embodiment, the trailer 11 has a length of 24 feet and an outside width of about 93 inches. The height of the trailer is about 6 feet 4 inches. The length of the well 23 is 12 feet while its basic width is 54 inches. Since it slopes downward toward the rear, adequate drainage is provided. The roller 31 has a width of 24 inches while the rollers 33 and 35 are 12 inches in width. Roller 37 is 6 inches in width. A trailer having these dimensions may support and transport a boat up to 17 feet in length.

Referring specifically to FIG. 3, the base of the trailer is formed from 2 inch by 5 inch tubular steel members welded together. Two master beams 103 and 104 extend the length of the trailer between which are welded the cross-beams 41, 43, 45, 47 and in addition cross-beams 105, 106, and 107. Outrigging beams illustrated at 109 and 111 are welded to the two main beams and in turn support angle iron members 113 and 115 to which the walls of the trailer are secured. The distance between beam 103 and angle iron 113 and between beam 104 and angle iron 115 is about 17 inches respectively. The distance between cross-beams 47 and 105, 105 and 106, and 106 and 107 is 4 feet respectively. Beam 41 is located 30 inches from the rear of the trailer while beam 47 is located 12 feet from the rear of the trailer. The distance between cross-beams 41 and 43, 43 and 45 and between 45 and 47 is about 38 inches respectively. Extending parallel to the main beam 104 and to the left thereof is a beam 117 which forms the right edge of the well 23. The distance between beam 117 and beam 104 is about 5 inches. Beam 117A extends from beam 41 to beam 104 to flare the rear of the well on its right side. The arm assemblies 63 and 65 have a length of about 12 inches each while the arm assemblies 67 and 69 have a length of about 10 inches each.

Welded to the bottom of cross-beams 105 and 106 is a bracket 118 to which the winch 55 is secured. The bracket has a plurality of holes for placing the winch at different positions to accommodate boats of different sizes. When securing the winch to the bracket a hole is drilled through the floor in alignment with a selected bracket hole.

Although the dimensions mentioned above have been found suitable for one embodiment of the trailer it is to be understood that trailers of different sizes may be built incorporating the present invention in order to support boats of different sizes.

The rear end door 19 comprises two sections 19A and 19B. The top portion of section 19A is hinged at 119 to the top of the trailer while the two sections 19A and 19B are hinged together at 121 whereby the door may be moved up and out of the way to allow a boat to be loaded and launched. Suitable locks (not shown) are employed to lock the door 19 in its open or closed positions. Each side of the lower section 19B of the door 19 has rollers 123 and 125 which are supported in guides illustrated at 127 and 129 formed in the back end structure of the trailer. When the door 19 is fully closed it extends slightly below the level of the floor surface 11C. An additional plate (not shown) may be inserted to cover the back edge of the well 23.

The walls 23A and 23B and the bottom 23C of the well are formed of steel plates and are coated with an undercoating material. They are secured to and supported by beams 103, 117, 117A and 47. The floor surface 11C is formed of exterior plywood as well as the removable floor sections 49, 51, and 53. Moreover the floor and removable floor sections are coated or covered with an undercoating material. The walls 11A and 11B of the trailer are coated with an undercoating material up to a height of about 8 inches above the level of the floor surface 11C. In one embodiment the undercoating material is of asphalt and aluminum.

Referring to FIG. 1, two beds 131 and 133 are provided for sleeping purposes. While the boat is being stored or towed in the trailer the beds are located above the boat and out of the way. In this respect an upper guide comprising a horizontal slot 135 formed in wall 11A is provided for supporting one end of the beds. The beds each have rollers coupled to one end which fit into the slot 135 for support purposes. Removable tubular members illustrated at 137 are provided for supporting the other ends of the beds at an elevated height. Legs 139 of the beds at their other ends, fit into these tubular members. After the boat has been removed and the floor sections inserted in place, the tubular members 137 may be removed and the rollers of the beds removed from slot 135 and inserted into a lower slot 141. The shorter legs 139 then are employed to support the other ends of the beds. Thus the beds may be positioned at a lower height for sleeping purposes.

Although not shown suitable cooking equipment, cabinets, etc. are provided in the front end of the trailer.

I claim:

1. A travel trailer for loading and carrying a boat and for providing living accommodations, comprising:
   trailer structure having a floor surface, side walls, a top, and an entrance in the rear end thereof for receiving and launching a boat,
   a well formed in the rear end of said trailer below the floor surface for receiving water when the rear end of said trailer is backed into the water to allow at least a portion of the bow of a boat to be floated in the rear portion of said well,
   a plurality of spaced pivot members forming pivot axes located in said well,
   a plurality of roller means each of which are coupled to first ends of arm means having opposite ends pivotally coupled to said pivot members for pivotal movement of said arm means and said roller means to inoperative positions in said well and to operative positions for receiving and supporting a boat, cross-beams extending across said well transverse to the length of said trailer and spaced from said pivot members for supporting said arm means and hence said roller means when moved to their operative positions, said roller means when in their operative positions allowing a boat to be launched from said trailer by way of the water received in said well when the rear end of said trailer is backed into the water, and movable floor section means adapted to cover said well when a boat is not supported in said trailer and to be moved to uncover said well to allow a boat to be supported in said trailer.

2. The trailer of claim 1 wherein:

said cross-beams support said roller means above the level of said floor surface when said arm means and said roller means are moved to their operative positions, said arm means and said roller means are adapted to be moved to their inoperative positions in said well below the level of said floor surface.

3. The trailer of claim 2 wherein:

said pivot members are elongated members extending transverse to the length of said trailer, said arm means and said roller means are adapted to be moved to different positions along said elongated pivot members and hence to different positions along the width of said well.

4. The trailer of claim 3 wherein:

said well is offset to the left side of the center of said trailer along its length.

5. A travel trailer for carrying a boat and for providing living accommodations, comprising:

a frame formed by beams including cross-beams extending transverse to the length of said frame, structure forming a floor surface supported by said beams, said trailer having side walls, a top and an entrance in the rear end thereof for receiving and launching a boat, a well formed in the rear end of said trailer below the floor surface for receiving water when the rear end of said trailer is backed into the water and for allowing a boat to be received at least partially in said well, a number of said cross-beams extending transversely through said well, a plurality of spaced pivot members forming pivot axes transverse to the length of said trailer and located in said well at positions spaced from said crossbeams extending transversely through said well, roller means coupled to first ends of arm means having opposite ends pivotally coupled to said pivot members for pivotal movement of said arm means and hence said roller means to operative positions for supporting a boat and to inoperative positions in said well, said movable arm means being adapted to be supported by said cross-beams extending through said well when said arm means and said roller means are moved to their operative positions, and movable floor section means adapted to cover said well for forming a part of the floor surface of said trailer when a boat is not supported by said roller means and adapted to be moved to uncover said well to allow a boat to be supported by said roller means.

6. The travel trailer of claim 5 wherein:

said well is formed by side wall structure and bottom wall structure connected to said side wall structure and which slopes downward below said beams toward the rear end of said trailer.

7. The travel trailer of claim 6 wherein:

said cross-beams extending through said well support said roller means above the level of said floor surface when said arm means and said roller means are moved to their operative positions, said arm means and said roller means being adapted to be moved to inoperative positions in said well below the level of said floor surface.

8. The trailer of claim 7 wherein:

said movable floor section means are removable floor section means unattached to said trailer.

9. The trailer of claim 5 wherein:

said well is offset to the left side of the center of said trailer along its length, and said arm means and said rollers are adapted to be adjusted to different positions along the width of said well.

* * * * *